F. I. STILES.
TOILET FOR AUTOMOBILES.
APPLICATION FILED SEPT. 8, 1919.
1,359,544.
Patented Nov. 23, 1920.
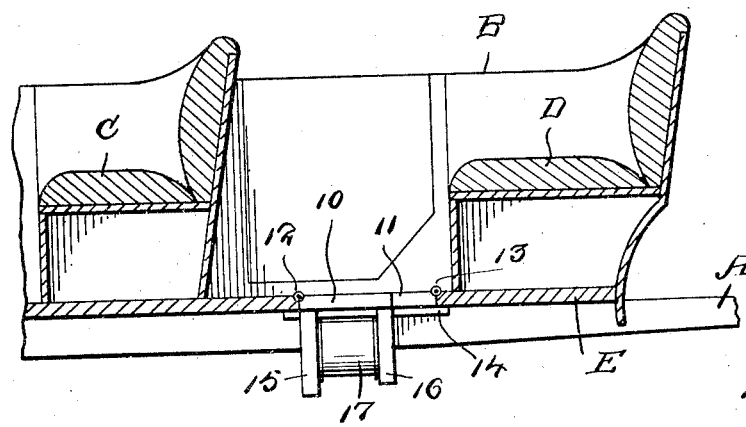
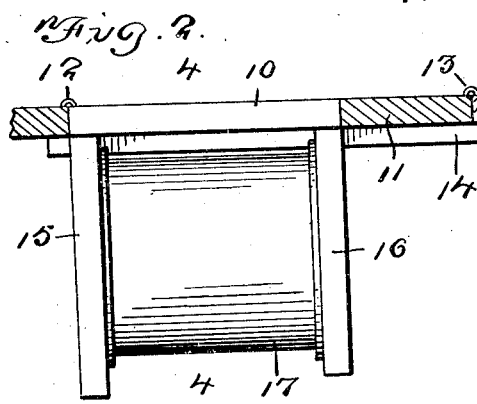
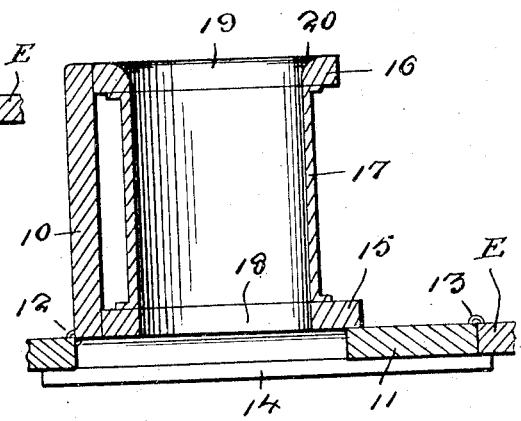
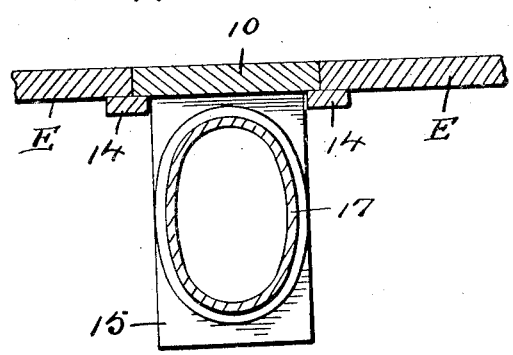
Inventor
F. I. Stiles
Witnesses
E. R. Ruppert
By Victor J. Evans
Attorney

UNITED STATES PATENT OFFICE.

FRANK I. STILES, OF COCOANUT GROVE, FLORIDA.

TOILET FOR AUTOMOBILES.

1,359,544.

Specification of Letters Patent.

Patented Nov. 23, 1920.

Application filed September 8, 1919. Serial No. 322,273.

*To all whom it may concern:*

Be it known that I, FRANK I. STILES, a citizen of the United States, residing at Cocoanut Grove, in the county of Dade and State of Florida, have invented new and useful Improvements in Toilets for Automobiles, of which the following is a specification.

This invention relates to toilet devices for automobiles and has for its object the provision of a commode structure located preferably between the front and rear seats and so constructed that when not in use the commode will be disposed entirely beneath the floor of the automobile in such position that it may be readily raised to operative position, a portion of the floor being hinged with one hinged section forming part of the commode and movable therewith, and the other section acting as means for holding the commode structure in operative position.

An important object is the provision of a device of this character which will be very simple and inexpensive in manufacture and installation, highly convenient in use, durable in service, and a general improvement in the art.

With the above and other objects and advantages in view, the invention consists in the details of construction to be hereinafter more fully described and claimed and illustrated in the accompanying drawing in which—

Figure 1 is a longitudinal sectional view through a portion of an automobile showing my device in inoperative position.

Fig. 2 is a similar view showing my device on a larger scale,

Fig. 3 is a longitudinal sectional view through my device raised into operative position, and Fig. 4 is a cross sectional view on the line 4—4 of Fig. 2.

Referring more particularly to the drawing, the letter A designates a portion of the frame of an automobile, B designates a portion of the body including the seats C and D and the floor E.

In carrying out my invention a portion of the floor E, preferably between the seats C and D, is cut away to provide a rectangular opening and this opening is normally closed by a pair of boards 10 and 11 hinged, as shown at 12 and 13, respectively, at the forward and rear edges of the opening. Secured upon the under side of the floor E and extending beyond the side edges of the opening, are cleats 14 which prevent the boards 10 and 11 from moving downwardly.

Secured upon the under side of the board 10 at the forward and rear edges thereof, are other boards 15 and 16, respectively, between which is secured a pipe-like member 17 formed of any desired material which is preferably elliptical in cross section, as clearly shown in Fig. 4. The boards 15 and 16 serve as the base and seat portion respectively, of the commode and are provided with holes 18 and 19 of the same size as and registering with the opening in the pipe-like member 17. It is preferable that the edges of the opening in the board 16 forming the seat be curved, as shown at 20, as is a common structure in toilet or commode seats. The board 15 forming the base is of greater length than the board 16 forming the seat, for a purpose to be described, and both boards are of the same width, that is the width of the opening in the floor of the automobile.

When the device is installed and is in normal or inoperative position it is arranged as shown in Figs. 1, 2 and 4, that is the board sections 10 and 11 are in horizontal position closing the opening in the floor and the commode structure is disposed in horizontal position entirely concealed from view beneath the floor. When the use of the device is desired, the operator first lifts the board 11, swinging it upon its hinges 13 and then swings the board 10 upwardly upon its hinges 12 thereby raising the commode structure through the opening in the floor. The commode structure is swung until it is at an acute angle with respect to the floor E whereupon the operator returns the board 11 to its normal position resting upon the cleats 14, after which the commode structure is swung until the free end of the board 15 forming the base thereof engages upon the top of the board 11, holding the commode structure in vertical position ready for use. As both ends of the commode structure, that is the boards 15 and 16, are provided with holes it will be seen that any matter deposited therein will fall through. When the use of the device is no longer desired it is merely necessary to swing the commode structure out of engagement with the board 11 whereupon the commode structure may be swung downwardly until the board 10 supporting the same rests upon the cleats 14, subsequently to which the board 11 is also swung downwardly.

From the foregoing description and a study of the drawing it will be apparent that I have thus provided a very simple structure whereby an automobile may be equipped with toilet facilities for the comfort and convenience of the occupants even while the vehicle is traveling.

While I have shown and described the preferred embodiment of my invention it is of course to be understood that I reserve the right to make such changes in the form, construction, and arrangement of parts as will not depart from the spirit of the invention or the scope of the subjoined claims. For example I may find it desirable to provide a suitable curtain or canopy disposable over the user of the device, this curtain or canopy being supported from the roof or top, the side of the body or the seat, depending upon the particular make or style of automobile.

Having thus described my invention, I claim:

1. In combination with an automobile body having its floor provided with an opening, a pair of boards hinged at opposite edges of said opening and normally closing the same, a commode structure carried by one of said boards and normally disposed beneath the floor, said commode structure being swingable to be disposed above the floor, and means for holding said commode structure in said last named position.

2. A toilet device for automobiles having the floor provided with an opening, comprising a pair of cleats secured upon the under side of the floor and overlapping opposite edges of the opening, a pair of boards hinged upon the opposite other edges of the opening and normally seating upon said cleats, a pair of boards secured upon one of said hinged boards, a pipe-like member disposed between said pair of last named boards, said last named boards being provided with openings registering with the opening in said pipe-like member, said last named board constituting the top and base of a commode structure, and the board forming the base being of greater length than the board forming the top whereby to rest upon the other of said first named boards whereby to hold said commode structure in vertical position above the floor.

3. In combination with an automobile body having its floor provided with an opening, a commode structure hingedly connected with the floor and having a portion normally filling said opening and flush with the top of the floor, said commode structure being swingable upwardly whereby to be disposed in vertical position above said opening, and means for holding said commode in said upright position.

In testimony whereof I affix my signature.

FRANK I. STILES.